Figure 1:
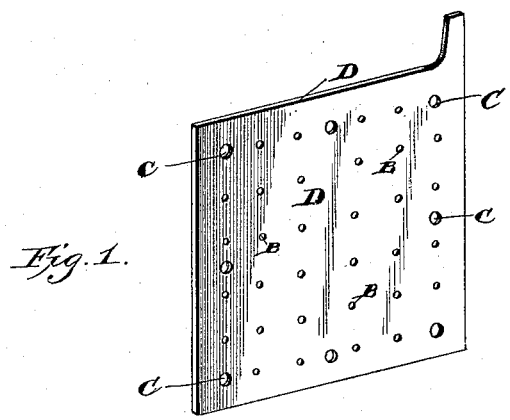

(No Model.)

C. W. KENNEDY.
ELECTRODE FOR SECONDARY BATTERIES.

No. 441,959. Patented Dec. 2, 1890.

WITNESSES:

INVENTOR:
Charles W. Kennedy
by Louis Bagger & Co.
his Attorneys.

UNITED STATES PATENT OFFICE.

CHARLES W. KENNEDY, OF PHILADELPHIA, PENNSYLVANIA, ASSIGNOR, BY DIRECT AND MESNE ASSIGNMENTS, TO THE KENNEDY-GROSWITH ELECTRIC COMPANY, OF SAME PLACE.

ELECTRODE FOR SECONDARY BATTERIES.

SPECIFICATION forming part of Letters Patent No. 441,959, dated December 2, 1890.

Application filed June 23, 1890. Serial No. 356,355. (No model.)

*To all whom it may concern:*

Be it known that I, CHARLES W. KENNEDY, a citizen of the United States, and a resident of Philadelphia, in the county of Philadelphia and State of Pennsylvania, have invented certain new and useful Improvements in Secondary Batteries; and I do hereby declare that the following is a full, clear, and exact description of the invention, which will enable others skilled in the art to which it appertains to make and use the same, reference being had to the accompanying drawings, which form a part of this specification.

This invention relates to improvements in electrical batteries, and is designed more particularly as an improvement upon what are known as "secondary batteries," or "storage-batteries," the object of my invention being twofold—viz., first, to materially reduce the weight of that class of batteries by reducing the weight of the several so-called "grids" or plates forming parts of the electrodes or elements of which the battery is built up or composed, and, secondly, to reduce the cost of manufacture of the grids, so as to make it possible to produce an electric battery of maximum power combined with minimum of weight and cost of manufacture.

With these objects in view my invention consists in constructing the metallic plates or walls between which the so-called "active material" is confined not wholly of lead, as has heretofore been the practice, but of some other metal which is stiffer, lighter, and less expensive than lead—such, for example, as thin iron, steel, or any other metal which possesses sufficient stiffness and rigidity when rolled or beaten into thin plates, which plates (themselves neutral or inactive) are then coated with a thin film of pure metallic lead. In this manner by forming an interior thin body-plate or skeleton plate and coating the same with metallic lead (in other respects constructing the lead-coated plate in any of the numerous ways in which such plates are made in the construction of the so-called "grids") I am enabled to make grids or electrodes which will weigh considerably less than any grids having the same amount of active superficial area, which it will cost less to produce than grids of the same capacity made of pure lead, while at the same time my improved electrodes will be found capable of "forming" and developing the same amount of energy as electrodes the grids of which are made wholly of lead and some active material and which present the same superficial area to be acted on by the exciting liquid.

Figure 2:
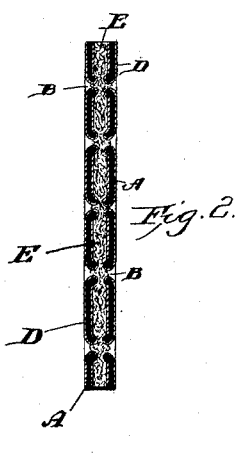
Figures 3, 4:
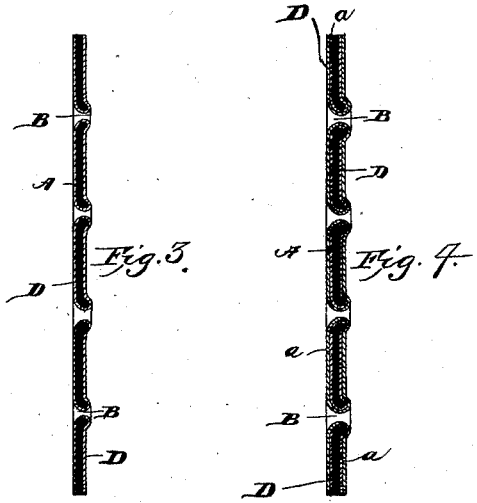

In the accompanying drawings, Figure 1 is a perspective view of one of my improved plates used in building up my improved grid or electrode. Fig. 2 is a sectional view through a portion of one of the complete grids or electrodes at right angles to the same. Fig. 3 is a sectional detail view of one of my improved plates, two of these plates being necessary in the construction of each separate grid or electrode; and Fig. 4 is a similar view illustrating a slightly-modified construction of the plate.

Like letters of reference denote corresponding parts in all the figures.

In order to prepare my improved plate, I first take a thin sheet or plate of steel, iron, aluminium, or any other suitable metal, or other material. This plate is represented by the black part marked with the letter A in the figures, and is what forms the inner body, skeleton, or stiffening of the complete plate. This skeleton plate A is punctured or perforated, (preferably by punching or drilling,) so as to present rows of apertures B, and the bolt-holes (shown at C) are also formed at this stage and before the plate receives its coating of lead. After the plate A has been prepared in this manner to give it the outward semblance or appearance of an ordinary grid-plate, I cover it with a thin film or coating of pure metallic lead (shown at D) in such a manner that the film of lead will not only completely and absolutely cover the flat sides or surfaces of the plate on both sides, but also the edges of the plate and the edges of the bolt-holes and apertures B, so that no part of the body of the skeleton plate A itself, however minute, is devoid of covering. It is of the utmost importance that the lead covering or coating be absolutely integral and perfect. Hence the necessity of making all apertures and bolt-holes in the skeleton plate before it is coated with lead, as if the plate received its lead coating before being punctured the drilling or punching of the holes would rupture the film of lead and expose the material of which plate A itself is made, the object of the apertures B being to afford access of the acid solution into which the electrodes are immersed to the "active material" E, which is confined between the plates; but by perforating the plates before they are covered with the film of lead then this film (assuming that proper care is taken in the process of manufacturing the plates) will cover and protect even the most minute part of the inside skeleton plate A. It is also of the utmost importance that the lead film D should adhere tenaciously to the plate A, so that it will not peel or scale off, but will at all times adhere firmly to plate A. I have found by experiment that I can coat a plate of iron or steel with absolutely pure metallic lead in such a manner that this thin lead coating cannot scale off or peel off, no matter how rough the usage to which the plate may be subjected, and I have also found that the capacity—i. e., development of electrical energy—of the electrode does not depend upon the thickness or depth of the lead coating, as in a properly-constructed secondary battery no action takes place in the body of the plate itself, but only on the external surface of the lead and in the peroxide E, which is confined between the plates, and which is what constitutes the so-called "active material" in contradistinction of the plates themselves, which are by comparison "inactive," and the object of which in this class of electrodes is merely to confine or form a foraminated casing for the active material.

In Fig. 4 of the drawings I have shown the skeleton plate A provided with an intermediate coating $a$ of tin, which, in its turn, is coated with the lead film D. This construction of the plate may be employed advantageously where the skeleton plate A is made of some metal which cannot easily be coated or plated with pure metallic lead without the use of a flux. As is well known, it is important that the lead covering, which is exposed to the action of the acid solution, should be made of absolutely pure metallic lead, in order to enable the electrodes to "form" readily, and I have found that it affects the plates injuriously if the lead which is to form the exterior coating contains any flux or other foreign substance. For this reason in all cases where the inside skeleton or frame plate A is of some material which cannot be plated with lead it will be found that the lead plating or coating may readily be applied by first "tinning" the plate or electroplating the same, and afterward coating the tinned or electroplated plate A with pure metallic lead. In this manner it will be seen that I greatly reduce the weight of the side plates between which the active material is confined without in the least detracting from the storage capacity, energy, or efficiency of the electrode, as it is a well-known fact that only the actually exposed surfaces of these plates enter into play, whereas the inner body of the side plate itself is absolutely inert; yet, owing to the softness and ductility of pure metallic lead, it has been found impracticable to make these side plates of the compound electrode very thin, as such thin plates, if made wholly of lead, would bend or break; but by my invention—that is to say, by constructing a compound or lead-plated side plate in the manner hereinbefore described—these plates may be made very thin indeed, (almost as thin as ordinary writing-paper,) thereby very greatly reducing the weight of the complete electrode, and yet make it susceptible of receiving the same charge and of developing the same electrical energy as if the compound side plate were made wholly of lead.

Having thus described my invention, I claim and desire to secure by Letters Patent of the United States—

An electrode for electric batteries, consisting of two or more plates of rigid metal coated on both sides with metallic lead, said plates being connected together with an intervening space filled with active material, and provided with apertures for the passage of the exciting-liquid, substantially as described.

In testimony that I claim the foregoing as my own I have hereunto affixed my signature in presence of two witnesses.

CHARLES W. KENNEDY.

Witnesses:
LOUIS BAGGER,
AUGUST PETERSON.